US007938324B2

(12) United States Patent
Tamarkin et al.

(10) Patent No.: US 7,938,324 B2
(45) Date of Patent: May 10, 2011

(54) HIERARCHICAL COUNTING OF INVENTORY

(75) Inventors: Noam Tamarkin, Binyamina (IL); Adi Chibel, Holon (IL); Eli Pripaz Cohen, Ramat Gan (IL); Yuval Morad, Bney Brack (IL); Nir Pachter, Moshav Gealia (IL)

(73) Assignee: SAP AG, Walldorf (DE)

( * ) Notice: Subject to any disclaimer, the term of this patent is extended or adjusted under 35 U.S.C. 154(b) by 1027 days.

(21) Appl. No.: 11/475,470

(22) Filed: Jun. 27, 2006

(65) Prior Publication Data

US 2007/0295808 A1 Dec. 27, 2007

(51) Int. Cl.
*G06F 19/00* (2011.01)
*G06Q 30/00* (2006.01)
*G06Q 90/00* (2006.01)

(52) U.S. Cl. .......... 235/385; 235/375; 235/383; 705/22; 705/28

(58) Field of Classification Search ................ 235/375, 235/383, 385; 705/10, 22, 25, 28
See application file for complete search history.

(56) References Cited

U.S. PATENT DOCUMENTS

| | | | |
|---|---|---|---|
| 4,972,318 A | 11/1990 | Brown et al. | |
| 5,406,297 A | 4/1995 | Caswell et al. | |
| 5,774,876 A | 6/1998 | Woolley et al. | |
| 5,804,820 A | 9/1998 | Evans et al. | |
| 5,892,441 A | 4/1999 | Woolley et al. | |
| 5,936,860 A | 8/1999 | Arnold et al. | |
| 7,054,704 B2 | 5/2006 | Bickley et al. | |
| 2003/0136834 A1* | 7/2003 | Scheurer ...................... 235/385 |
| 2003/0204480 A1* | 10/2003 | Heinrichs et al. ................. 707/1 |
| 2004/0024730 A1 | 2/2004 | Brown et al. | |
| 2004/0181467 A1 | 9/2004 | Raiyani et al. | |
| 2005/0027604 A1 | 2/2005 | Bandy et al. | |
| 2007/0156536 A1* | 7/2007 | Alfandary et al. .............. 705/22 |
| 2007/0174146 A1* | 7/2007 | Tamarkin et al. .............. 705/28 |
| 2007/0203811 A1* | 8/2007 | Hoopes et al. ................. 705/28 |

* cited by examiner

*Primary Examiner* — Daniel A Hess
*Assistant Examiner* — Ali Sharifzada
(74) *Attorney, Agent, or Firm* — Fish & Richardson P.C.

(57) ABSTRACT

A computer-implemented method for counting stock stored in hierarchical levels at a facility is described. The method includes receiving count initiation information at a counting module. The count initiation information includes at least one parameter associated with stock to be counted and one or more hierarchical levels for the stock to be counted. The method also includes receiving quantity information associated with the one or more hierarchical levels, and generating count results based on the received quantity information. In certain embodiments, the quantity information can be received by multiple count activity objects associated with the counting module. Each count activity object can independently track separate portions of the quantity information.

22 Claims, 5 Drawing Sheets

HIERARCHICAL COUNTING OF INVENTORY

TECHNICAL FIELD

This document relates to a system and method for hierarchical counting of inventory.

BACKGROUND

Tracking inventory has traditionally been an important component in managing a variety of businesses that sell, transport, and manufacture stock. By counting inventory, the businesses can determine, for example, if stock is missing, how much stock the business needs to fulfill current and future orders, and how much stock is stored at a particular location.

As areas used to store stock, such as warehouses, have increased in size, it is becoming less and less practical to have the counting of stock managed and performed solely by employees. Businesses have used computerized inventory systems to meet this growing impracticality.

Some current computerized inventory systems track inventory only at the lowest level of resolution within the system. For example, the inventory system may track bins of items, but not the pallets that the bins are stored upon, or the aisles in which the pallets are located. Additional some inventory systems require counting every tracked item. This may require putting a physical block on an entire location (i.e., prohibiting movement of stock into or out of the location) until the entire count is finished. Additionally, some inventory systems can only count locations, and inventory located at resources, such as an incoming truck or a production machine, may remain uncounted.

SUMMARY

The present specification relates to counting inventory in a logistic site, where in the inventory count may be counted based on multiple levels.

In a first general aspect, a computer-implemented method for counting stock stored in hierarchical levels at a facility is described. The method includes receiving count initiation information at a counting module. The count initiation information includes at least one parameter associated with stock to be counted and one or more hierarchical levels for the stock to be counted. The method also includes receiving quantity information associated with the one or more hierarchical levels, and generating count results based on the received quantity information.

In certain embodiments, the quantity information can be received by multiple count activity objects associated with the counting module. Each count activity object can independently track separate portions of the quantity information. Additionally, each separate portion can correspond to a different location. Alternatively, one or more of the separate portions can correspond to a particular hierarchical level.

In other embodiments, the method further can include generating an expanded report from the count results, wherein the expanded report lists the one or more hierarchical levels and the quantity information associated with each hierarchical level. The hierarchical levels can include categorizations of stored stock selected from a group consisting of material, storage container, location, resource, logistic unit abstraction defined by common storage attributes, and storage organizational level.

In a second general aspect, a system for counting stock is described. The system includes an interface for receiving count initiation information that includes an identifier for stock to be counted at one or more hierarchical levels, one or more count activity objects to each accumulate a count for a portion of the stock to be counted, and a count instance associated with the one or more count activity objects. The count instance can generate a total count of the stock to be counted by aggregating counts of stock accumulated by each count activity object.

The systems and techniques described here may provide one or more of the following advantages. First, a counting system may facilitate parallel counting of different locations so that the counting of a particular location is not dependent upon finishing a count of a different location. Second, the ability to count at different hierarchical levels permits flexibility so that inventory may be tracked using a variety of parameters regardless of whether the parameters are supported in a managing system's transactions. Third, a system may facilitate counting by RFID because hierarchical levels that have individual RFID tags can be counted instead of lower hierarchical levels that are not associated with RFID tags. Fourth a system may increase efficiency by enabling approximate inventory counts when an exact count is unnecessary or undesirable.

The details of one or more embodiments of the hierarchical counting system and methods are set forth in the accompanying drawings and the description below. Other features and advantages of the described system and methods will be apparent from the description and drawings, and from the claims.

DESCRIPTION OF DRAWINGS

Like reference symbols in the various drawings indicate like elements.

DETAILED DESCRIPTION

Figure 1:
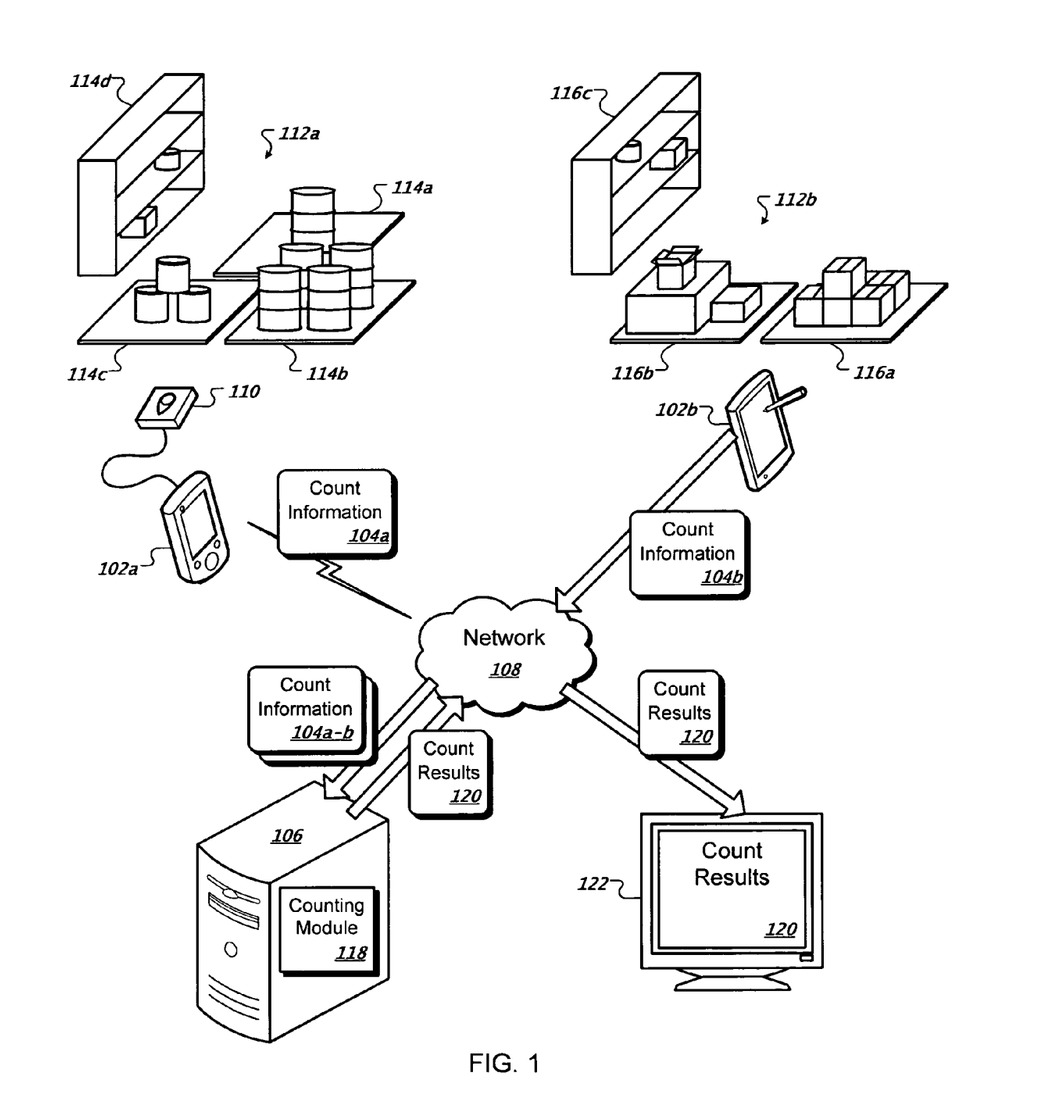
FIG. 1 is a schematic diagram of an example system for counting stock stored at a location in hierarchical levels.

FIG. 1 is a schematic diagram of an example system 100 for counting stock stored at a location in hierarchical levels. Computer devices 102a-b transmit count information 104a-b to a counting system 106 via a network 108. The count information 104a-b may include, for example, a quantity of items, a weight of items, or a volume of items. In addition, the count information 104a-b may be measured at an individual material level or another level, such as a box, crate, carton, or other logistic unit level (i.e., a composition established for transport and/or storage, which needs to be tracked through the supply chain).

The network 108 may be any suitable network, such as a LAN (local area network), a WAN (wide area network), the Internet, or some combination of networks. The network 108 may be wire-line, wireless, or some combination of the two.

Users may input the count information 104b manually using, for example, a touch screen device of the computer device 104*b*. Alternatively, a user may automatically input the count information 104*a* using a scanner device 110, such as a barcode reader or an RFID (radio frequency identification) scanner, of the computer device 102*a*.

The stock may be located in one or more logistic areas depicted as locations 112*a-b*. Logistic areas include locations within a logistic facility (e.g., warehouse or production facility), such as aisles of a warehouse, a loading dock of a warehouse, or a particular resources in a logistic facility (e.g., a truck, forklift, workers, or production machinery). The locations 112*a-b* may be part of a hierarchy of levels that define the category and/or organization of an individual material.

The first location 112*a* includes hierarchy organization levels 114*a-d* corresponding to palettes and shelves within the first location 112*a*. The second location 112*b* includes organizational hierarchy levels 116*a-c*. Other examples of organization hierarchy levels may include an aisle, bin, case, package, carton, or other logistic unit. Examples of category hierarchy levels may include temperature requirements, food/liquid storage requirements (e.g., expiration dates), transport requirements, or other handling requirements. For example, a particular material, such as Wensleydale cheese, may be stored in the first location 112*a* and on the first palette 114*a*. The Wensleydale cheese material may require refrigeration, should be aged for six months, and requires a forklift to move.

Multiple count activities may occur at the multiple locations 112*a-b* during a particular time period. For example, a user of the computer device 102*a* may perform a count at the first location 112*a* while a user of the computer device 102*b* performs a count at the second location 112*b*.

Accounting module 118, included in the counting system 106, generates count results 120. The counting system 106 transmits the count results 120 to a user interface 122. The user interface 122 presents the count results to a user. The count results 120 may include, for example, the received count information 104*a-b*, expected count information, and/or deviations between the received count information 104*a-b* and the expected count information. In certain implementations, the counting module 118 aggregates the count information 104*a-b* resulting from the multiple count activities. In other implementations, the counting module 118 updates the count results 120 as the count information 104*a-b* is received. For example, the user interface 122 may present the count results 120, first, including the results based on the count information 104*a* from the first count activity. The count module 118 may then update the count results 120 to include results based on the count information 104*b* from the second count activity.

The counting system 106 can include logic to split a requested inventory count into separate tasks, each to be handled by a counting objects. For example, if an inventory count is requested to count 100 bins, the logic can split the counting responsibilities up so that each task counts 10 bins. In this example, 10 tasks would be generated to count the 100 bins. In one implementation, the logic may split the inventory count based on user input. In another implementation, the logic can split the tasks based on preconfigured variables, such as how many bins one worker can count during a time period.

In certain implementations, generating the count results 120 includes selecting count information to be included in the count results 120. For example, a user may wish to see a count of materials only at the first location 112*a*. The user may select, for example, an identifier of the first location 112*a* indicating that the count results 120 only include the count information 104*a*. Alternatively, the user may select some other count initiation information, such as a particular material to count (e.g., Wensleydale cheese), a particular handling category to count (e.g., refrigerated materials), and/or a particular organizational level (e.g., the palette 114*a*).

Figure 2:
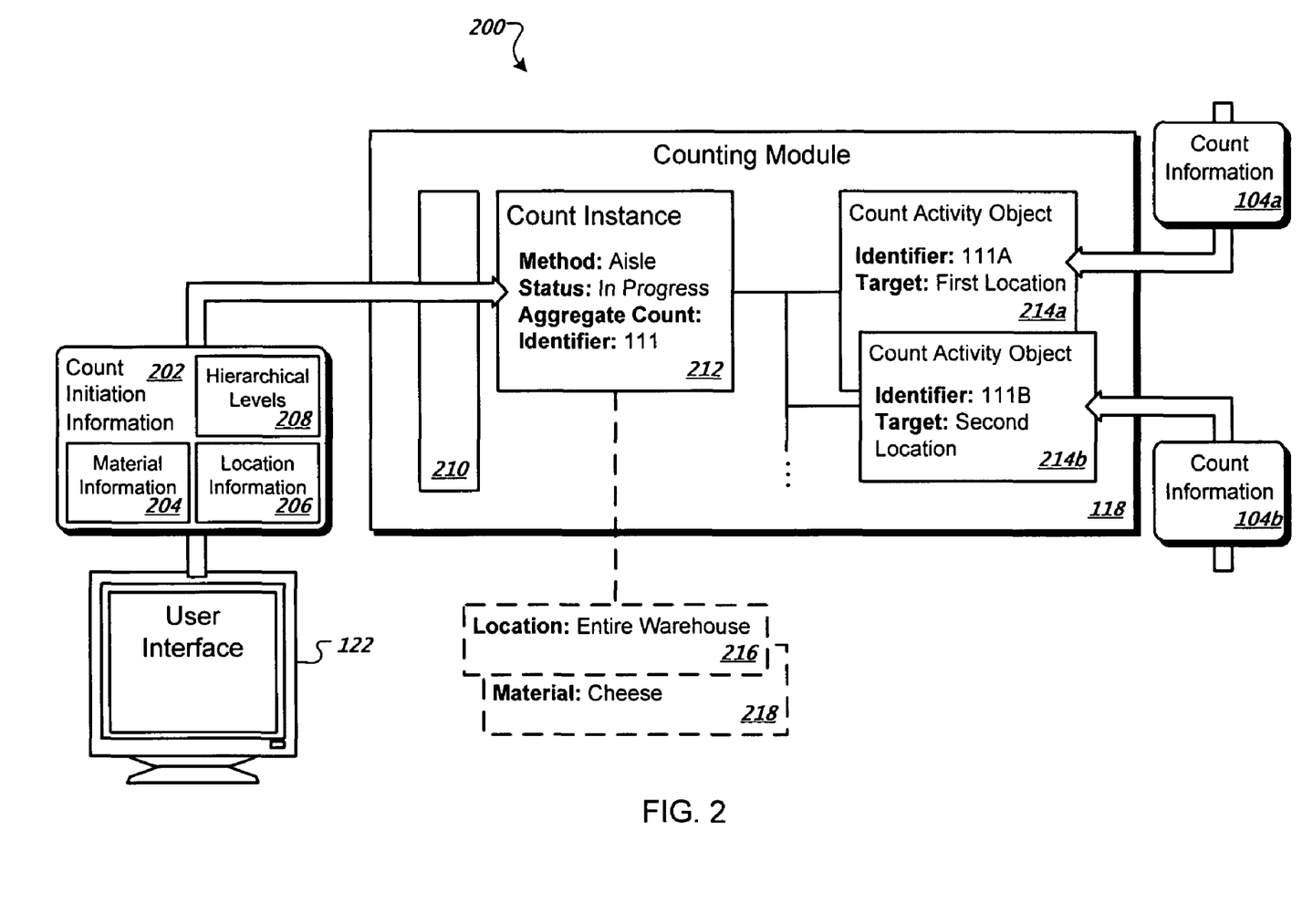
FIG. 2 is a block diagram of an example counting system including a counting module and interactions with the counting module.

FIG. 2 is a block diagram of an example counting system 200 including the counting module 118 and interactions with the counting module 118. A user may input count initiation information 202 using the user interface 122. Alternatively, the count initiation information 202 may be generated by the system 200 to ensure that an inventory count is performed on a periodic basis. In one implementation, the count initiation information 202 is included in an electronic document that is transmitted to the counting module 118, where the document includes the location(s) to be counted, the bins to count, etc.).

The count initiation information 202 may include parameters, such as material information 204, location information 206, and/or hierarchy information 208.

The material information 204 may include an identifier of a material to count and/or a quantity to be counted, such a number of items, a weight, or a volume. The location information 206 may include an identifier of a location where the count is to occur, such as a particular warehouse, aisle, loading dock, or truck.

The hierarchy information 208 may include an identifier of a hierarchy level for the count. For example, a hierarchy level identifier may indicate a particular level within a location where a count is to occur, such as the palette 114*a* within the first location 112*a*. In addition, a hierarchy level identifier may indicate the level at which a count is performed. For example, a count of palettes within a location may be performed instead of a count of the individual materials within the location. The palettes may include a predetermined number of material items making a count of individual items unnecessary or a count of individual items may be inferred from a count of the palettes.

The counting module 118 may receive the count initiation information 202 via an interface 210. The counting module 118 may use the count initiation information 202 to create a count instance 212. The count instance 212 may include properties, such as a count method (e.g., count by aisle hierarchy level), a status (e.g., "In Progress," "Complete," or "Approved"), and an identifier (e.g., "111"). The count instance 212 may have one or more associated count objects 214*a-b*. Each of the count activity objects 214*a-b* may include an identifier (e.g., "111A" and "111B," respectively) and a target (e.g., the first location 112*a* and the second location 112*b*, respectively). In addition, the count activity objects 214*a-b* may include the count information 104*a-b* (respectively), the expected count information (e.g., a recorded inventory amount), and the deviation between the count information and the expected count information. In certain implementations, the count activity objects 214*a-b* include the date and/or time at which the count was performed.

In certain implementations, the count instance 212 may have an associated location 216 (e.g., "Entire Warehouse) and/or material 218 (e.g., "Cheese"). The associated location 216 identifies a particular location where the count is to occur. The associated material 218 identifies a particular material to be counted.

Figure 3:
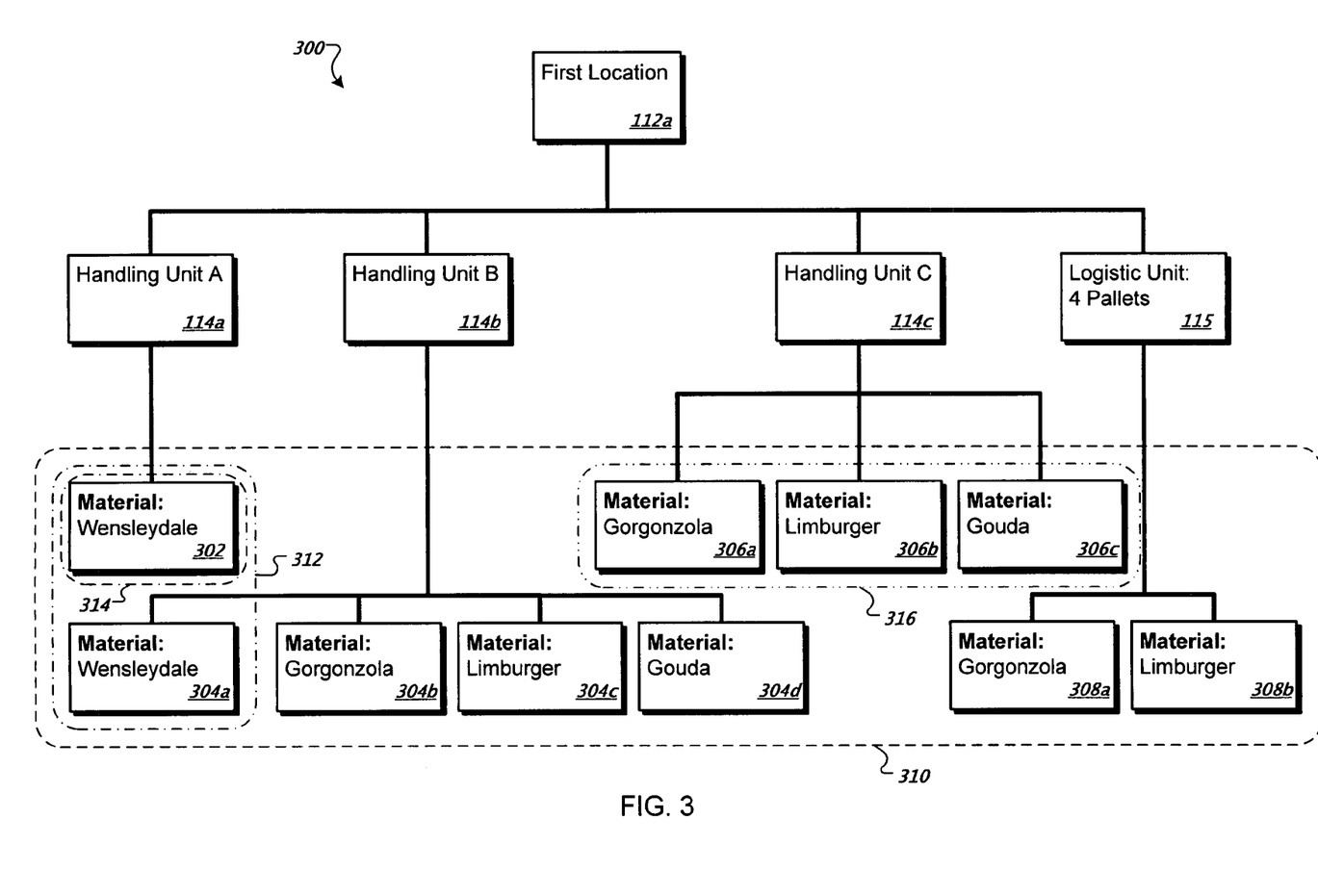
FIG. 3 is a block diagram of an example stock hierarchy of stock stored at a first location.

FIG. 3 is a block diagram of an example stock hierarchy 300 of stock stored at the first location 112*a*. The hierarchy 300 includes, below the first location 112*a*, the handling units, referred to here as identified logistic units 114*a-c*. The identified logistic unit can be for tracking materials. For example, identified logistic units can include packaging materials, such as cartons, pallets, bins, etc., that are used for storing or moving materials.

Although not depicted in FIG. 3, identified logistic units can be nested, for example, a pallet identified logistic unit can hold a carton identified logistic unit, which contains a box identified logistic unit that holds the material (e.g., cell phones).

At the material level, identified logistic units can include complete material identification and the quantity of material stored. Each identified logistic unit can have a unique scannable identification number encoded in standards, such as EAN 128 or SSCC.

The identified logistic unit 114a includes a material item 302 (i.e., a Wensleydale cheese). The identified logistic unit 114b includes material items 304a-d (i.e., Wensleydale, Gorgonzola, Limburger, and Gouda cheeses, respectively). The identified logistic unit 114c includes material items 306a-c (i.e., Gorgonzola, Limburger, and Gouda cheeses, respectively).

The hierarchy 300 also includes, below the location 112a, an unidentified logistic unit, referred to here as a logistic unit. Similar to the identified logistic unit, a logistic unit can be used to track materials. However, the logistic unit may not be associated with a particular packaging material. For example, the same logistic unit can represent a pallet, a half pallet, or a large carton.

A logistic unit can be defined by the common attributes that dictate how the unit is stored or moved. For example, a logistic unit may require a forklift to move and has to be stored in cold storage, but the physical packaging material can be either a pallet, a half pallet, a large carton, or all three.

A logistic unit can also be treated as stock in the way that a quantity can be associated with it. For example, the logistic unit 415 has a quantity attributes that informs the system that it includes four pallets.

The logistic unit 115 includes material items 304a-b (i.e., Gorgonzola and Limburger cheeses, respectively).

In a first example, the count instance 212 and the count activity objects 214a-b identify a particular count to be performed, such as a count of all the material items 302, 304a-d, 306a-c, and 308a-b in the first location 112a, as indicated by dashed line 310. In another example, the count initiation information 202 may indicate that only Wensleydale cheese in the first location 112a is to be counted, as indicated by dashed line 312. In yet another example, only Wensleydale cheese in the identified logistic unit 114a is counted, as indicated by dashed line 314. In a last example, all materials in identified logistic unit 114c are counted, as indicated by dashed line 316. Each example here refers to a count having a different scope, such as a particular material to be counted and a particular hierarchical level. Alternatively, the count may be performed as in the first example and the count module 118 may filter the count results 120 to obtain the results from the subsequent examples.

Figure 4:
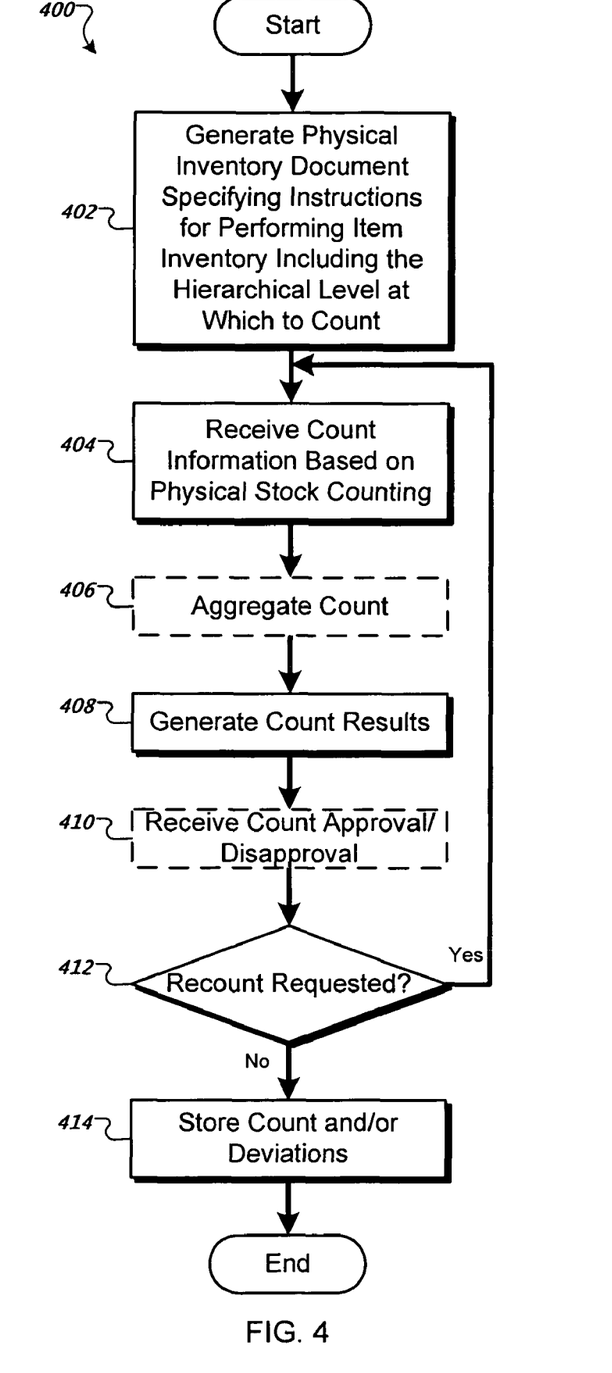
FIG. 4 is a flow chart of an example process for counting stock stored at a location in hierarchical levels.

FIG. 4 is a flow chart of an example process 400 for counting stock stored at a location in hierarchical levels. The process 400 may be performed, for example, by a system such as the systems 100, 200 and, for clarity of presentation, the description that follows uses the systems 100 and 200 as the basis of an example for describing the process 400. However, another system, or combination of systems, may be used to perform the process 400. The process 400 generates (402) a physical inventory document specifying instructions for performing item inventory including the hierarchical level at which to count. For example, the counting module 118 may output a physical inventory document specifying that all materials in the locations 112a-b are to be counted, based on the count initiation information 202.

The process 400 receives (404) count information based on physical stock counting. For example, a worker may view the generated physical inventor document and perform the inventor count using an RFID scanner. The counting module 118 may receive from the computer devices 102a-b the count information 104a-b derived from the scanned inventory.

Optionally, the process 400 aggregates (406) the count information. For example, the counting module 118 may aggregate the count information 104a-b in the count instance 212.

The process 400 generates (408) count results based on the count information. For example, the counting module 118 may generate the count results 120 including deviations between the count information 104a-b and the expected count information.

Optionally, the process 400 receives (410) count approval or disapproval from a user. For example, the counting module 118 may receive a user input indicating that the count instance 212, or the count activity objects 214a-b, status is "Approved." The counting module 118 may update the status in the count instance 212 or the count activity objects 214a-b.

If the count is disapproved, a recount may be requested (412). If requested, then the process 400 generates (402) another physical inventory document or a new count item under the same physical inventor document. If no recount is requested, then the process 400 stores (414) the counts and/or the deviations. For example, a first count of items may focus on a hierarchy level above the individual material item level, such as crates, boxes, or cartons. A user may determine that a count deviation is greater than an acceptable threshold and initiate a recount, for example, at a different level, such as an individual material item level.

Alternatively, a recount may be automatically performed if the counting module 118 determines that a count deviation exceeds a predetermined threshold or a count may be automatically approved if the deviation is less than a particular threshold. In certain implementations, the count deviation is expressed as a monetary value based on the count information, the expected count information, and a cost per count information value.

Figure 5:
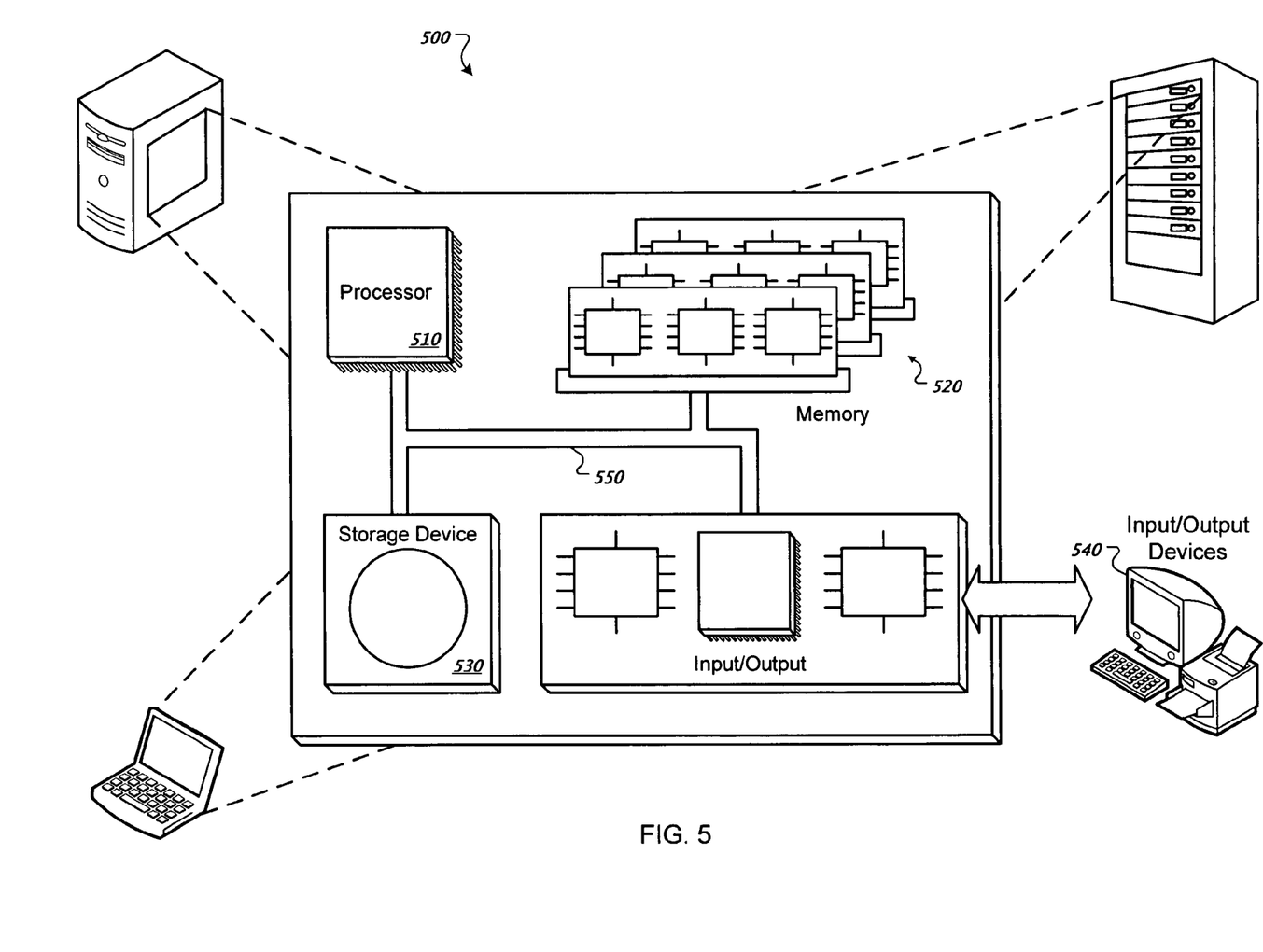
FIG. 5 is a schematic diagram of an example generic computer system.

FIG. 5 is a schematic diagram of an example generic computer system 500. The system 500 can be used for the operations described in association with the FIG. 3 and the method 400 according to one implementation. For example, the system 500 may be included in either or all of the counting system 106, the computer devices 102a-b, and a computer device displaying the user interface 122.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces, such as the user interface 122.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, the counting system 106 and the computer devices 102a-b can be implemented within the same computing system. In another example, the date and time of the inventory count may be transmitted to a database and used to determine the timing of future inventory counts. If the system is configured to count a certain material or location after a predetermined time, the system can used the stored date and time of the last count to determine whether and when a future account should occur.

In addition, the logic flows depicted in the figures do not require the particular order shown, or sequential order, to achieve desirable results. In addition, other steps may be provided, or steps may be eliminated, from the described flows, and other components may be added to, or removed from, the described systems.

In certain embodiments, a recount may be initiated if an initial count and an expected count create a deviation greater than a predetermined monetary value. For example, the system can include a monetary threshold of one hundred dollars associated with cases of sunglasses, each pair of sunglasses being valued at ten dollars and eight pairs of sunglasses packed in a case. If the initial count indicates that one case of sunglasses is missing, a recount will not be initiated because the amount of money associated with the missing sunglasses is eighty dollars and does not exceed the one hundred dollar threshold. If, however, the initial count indicates that two cases are missing, a recount of each pair of sunglasses may be determined because the amount of the missing sunglasses (i.e., $160) exceeds the predetermined monetary threshold.

In other embodiments, the results of the counting can be reported with different levels of detail. For example, if the system receives instructions to count the number of bottles of MAT1 in location1, the count output may include the complete hierarchy at the detailed level or a the hierarchy at an aggregate or truncated level. In this example, the detailed level reporting can contain the information: 200 bottles of MAT1 inside 20 LU_wine_box in location1. Reporting at the aggregated level may appear as: 200 bottles of MAT1 at location1. Additionally, the reporting format may include report information at a level of detail between the full detail and the aggregated level. In certain embodiments, the user specifies the level of detail reported by the system.

In yet other embodiments, the system may include a reverse count feature. This can allow a user to "undo" an erroneous count without generating another counting process. For example, a worker may accidentally scan some stock from the wrong bin. The worker could then press a "reverse" button displayed on a user interface of a device used for the scanning, and the posting of the count deviations could be canceled.

The undo process may be accomplished differently depending on which objects or databases receive the undo request. For example, a count deviation posted to an inventory object may be cancelled (e.g., if the deviation is +100, the posting of the deviation can be cancelled), whereas if the deviation is posted to a finance object, the deviation can be posted, but then nullified (e.g., if the deviation is +100, it can be nullified by subtracting 100).

In certain other embodiments, the count results can reported based on stock separators that describe attributes associated with the stock, such as a batch number, a manufacturer or owner, and an expiration date. For example, the results may be reported so that a count for a material with a common batch number is displayed. The stock separator information can be included in the count information 104 and used by the counting module to generate reports based on the separator information.

A number of embodiments of the hierarchical systems and methods have been described. Nevertheless, it will be understood that various modifications may be made without departing from the spirit and scope of the described system and methods. Accordingly, other embodiments are within the scope of the following claims.

What is claimed is:

1. A computer-implemented method for counting stock stored in hierarchical levels at a facility comprising:
   receiving count initiation information at a counting module, the count initiation information: (i) comprising at least one parameter identifying stock to be counted, and (ii) identifying a particular hierarchical level from among a hierarchy of levels, the levels of the hierarchy except for a highest-level of the hierarchy being lower-levels of the hierarchy, the levels of the hierarchy except for a lowest-level of the hierarchy being higher-levels of the hierarchy, each level of the hierarchy assigned a type of logistic unit from among different types of logistic units, a type of logistic unit for the particular hierarchical level being different than a type of logistic unit for at least one other of the levels, each of the logistic units physically including stock, and the logistic units for the levels of the hierarchy being nested so that: (i) logistic units assigned to any of the lower-levels of the hierarchy are spatially included in at least one logistic unit assigned to one of the higher-levels of the hierarchy, and (ii) logistic units assigned to any of the higher-levels of the hierarchy spatially include at least one logistic unit assigned to one of the lower-levels of the hierarchy, wherein the logistic unit for the particular hierarchical level has associated therewith a quantity value corresponding to a predetermined quantity of stock;
   requesting a count of the stock: (i) that includes a physical count of the logistic unit for the particular hierarchical level, and (ii) that does not include a physical count of types of logistic units for levels from the hierarchy other than the particular hierarchical level;
   in response to the request, receiving a stock quantity for the particular hierarchical level that was generated based on the physical count of the logistic unit for the particular hierarchical level and the quantity value for the particular hierarchal level;
   determining that a deviation between the received stock quantity and an expected stock quantity exceeds a predetermined threshold;
   selecting, in response to determining that the deviation exceeds the predetermined threshold, another level of the hierarchy that is assigned a type of logistic unit that is spatially included in the type of logistic unit that is assigned to the particular hierarchical level; and
   requesting a second count of the stock: (i) that includes a physical count of the logistic unit for the other level of the hierarchy, and (ii) that does not include a physical count of types of logistic units for levels from the hierarchy other than the other level of the hierarchy.

2. The method of claim 1, wherein the received stock quantity is received by multiple count activity objects associated with the counting module, wherein each count activity object can independently track separate portions of the stock quantity.

3. The method of claim 2, wherein each separate portion corresponds to a different location.

4. The method of claim 2, wherein one or more of the separate portions corresponds to the particular hierarchical level.

5. The method of claim 2, wherein generating the stock quantity comprises aggregating the separately tracked portions of the stock quantity.

6. The method of claim 1, further comprising generating an expanded report that lists each hierarchical level and a stock quantity associated with a physical count of the logistic unit for each hierarchical level.

7. The method of claim 1, further comprising generating a truncated report from the count results that lists the at least one parameter and stock quantity associated with the at least one parameter.

8. The method of claim 1, further comprising generating a report that lists a stock associated with a stock attribute and a corresponding stock quantity.

9. The method of claim 1, wherein the hierarchical levels comprise categorizations of stored stock selected from a group consisting of material, storage container, location, resource, logistic unit abstraction defined by common storage attributes, and storage organizational level.

10. The method of claim 1, further comprising associating a date of last count with the stock to be counted.

11. The method of claim 1, wherein the at least one parameter comprises a stock material identifier, a logistic area identifier, an identifier for a particular packaging component, or an identifier for a logistic unit abstraction defined by common storage attributes.

12. The method of claim 1, wherein the stock quantity includes a number of stock items, a weight of stock items, or a combination thereof.

13. The method of claim 1, further comprising initiating a separate count approval process that receives information selected from a group consisting of approval information that indicates a data structure should be updated with information based on the received stock quantity, rejection information that indicates the data structure should not be updated with the information based on the count results, and recount information that indicates the stock should be recounted regardless of the count results.

14. The method of claim 1, wherein the stock to be counted is a subset of a greater set of stock.

15. The method of claim 14, further comprising initiating a second stock count of the greater set of stock if the count results indicate a deviation between the received stock quantity and the expected stock quantity.

16. The method of claim 15, further comprising correlating a deviation between the received stock quantity and the expected stock quantity with a monetary amount and initiating the second stock count of the greater set of stock if the monetary amount exceeds a threshold.

17. The method of claim 1, further comprising initiating the second count of stock if user input indicates the received stock quantity is disapproved.

18. The method of claim 1, further comprising generating a physical inventory document comprising instructions for a worker to perform a physical inventory count.

19. The computer implemented method of claim 1, further comprising:
in response to the request for the second count of stock, receiving a second stock quantity that was generated based on the physical count of the logistic unit for the other level of the hierarchy and a quantity value associated with the logistic unit for the other level of the hierarchy and corresponding to a predetermined quantity of stock;
determining that a deviation between the received second stock quantity and the expected stock quantity does not exceed the predetermined threshold.

20. A system for counting stock comprising:
an interface for receiving count initiation information, the count initiation information:(i) comprising an identifier for stock to be counted at one or more hierarchical levels, and (ii) identifying a particular hierarchical level from among a hierarchy of levels, the levels of the hierarchy except for a highest-level of the hierarchy being lower-levels of the hierarchy, the levels of the hierarchy except for a lowest-level of the hierarchy being higher-levels of the hierarchy, each level of the hierarchy assigned a type of logistic unit from among different types of logistic units, a type of logistic unit for the particular hierarchical level being different than a type of logistic unit for at least one other of the levels, each of the logistic units physically including stock, and the logistic units for the levels of the hierarchy being nested so that: (i) logistic units assigned to any of the lower-levels of the hierarchy are spatially included in at least one logistic unit assigned to one of the higher-levels of the hierarchy, and (ii) logistic units assigned to any of the higher-levels of the hierarchy spatially include at least one logistic unit assigned to one of the lower-levels of the hierarchy, wherein the logistic unit for the particular hierarchical level has associated therewith a quantity value corresponding to a predetermined quantity of stock; and
a counting module to receive the count initiation information via the interface and to generate count results in response to receiving the count initiation information by:
requesting a count of the stock: (i) that includes a physical count of the logistic unit for the particular hierarchical level, and (ii) that does not include a physical count of types of logistic units for levels from the hierarchy other than the particular hierarchical level;
in response to the request, receiving a stock quantity for the particular hierarchical level that was generated based on the physical count of the logistic unit for the particular hierarchical level and the quantity value for the logistic unit for the particular hierarchal level;
determining that a deviation between the received stock quantity and an expected stock quantity exceeds a predetermined threshold;
selecting, in response to determining that the deviation exceeds the predetermined threshold, another level of the hierarchy that is assigned a type of logistic unit that is spatially included in the type of logistic unit that is assigned to the particular hierarchical level; and
requesting a second count of the stock: (i) that includes a physical count of the logistic unit for the other level of the hierarchy, and (ii) that does not include a physical count of types of logistic units for levels from the hierarchy other than the other level of the hierarchy.

21. A computer program product tangibly embodied in a machine-readable storage device, the computer program product including instructions that, when executed, perform operations to count stock at one or more specified hierarchical levels, the operations comprising:
receiving at a counting module: (i) at least one parameter identifying stock to be counted, and (ii) information identifying a particular hierarchical level from among a hierarchy of levels, the levels of the hierarchy except for a highest-level of the hierarchy being lower-levels of the hierarchy, the levels of the hierarchy except for a lowest-level of the hierarchy being higher-levels of the hierarchy, each level of the hierarchy assigned a type of logistic unit from among different types of logistic units, a type of logistic unit for the particular hierarchical level being different than a type of logistic unit for at least one other of the levels, each of the logistic units physically including stock, and the logistic units for the levels of the hierarchy being nested so that: (i) logistic units assigned to any of the lower-levels of the hierarchy are spatially included in at least one logistic unit assigned to one of the higher-levels of the hierarchy, and (ii) logistic units assigned to any of the higher-levels of the hierarchy spatially include at least one logistic unit assigned to one of the lower-levels of the hierarchy, wherein the logistic unit for the particular hierarchical level has associated therewith a quantity value corresponding to a predetermined quantity of stock;
requesting a count of the stock: (i) that includes a physical count of the logistic unit for the particular hierarchical level, and (ii) that does not include a physical count of types of logistic units for levels from the hierarchy other than the particular hierarchical level;
in response to the request, receiving a stock quantity for the particular hierarchical level that was generated based on the physical count of the logistic unit for the particular hierarchical level and the quantity value for the logistic unit for the particular hierarchal level;
determining that a deviation between the received stock quantity and an expected stock quantity exceeds a predetermined threshold;
selecting, in response to determining that the deviation exceeds the predetermined threshold, another level of the hierarchy that is assigned a type of logistic unit that is spatially included in the type of logistic unit that is assigned to the particular hierarchical level; and
requesting a second count of the stock: (i) that includes a physical count of the logistic unit for the other level of the hierarchy, and (ii) that does not include a physical count of types of logistic units for levels from the hierarchy other than the other level of the hierarchy.

22. A computer-implemented method for counting stock stored in hierarchical levels at a facility comprising:
receiving count initiation information at a counting module, the count initiation information: (i) comprising at least one parameter identifying stock to be counted, and (ii) identifying a particular hierarchical level from among a hierarchy of levels, the levels of the hierarchy except for a highest-level of the hierarchy being lower-levels of the hierarchy, the levels of the hierarchy except for a lowest-level of the hierarchy being higher-levels of the hierarchy, each level of the hierarchy assigned a type of logistic unit from among different types of logistic units, a type of logistic unit for the particular hierarchical level being different than a type of logistic unit for at least one other of the levels, each of the logistic units physically including stock, and the logistic units for the levels of the hierarchy being nested so that: (i) logistic units assigned to any of the lower-levels of the hierarchy are spatially included in at least one logistic unit assigned to one of the higher-levels of the hierarchy, and (ii) logistic units assigned to any of the higher-levels of the hierarchy spatially include at least one logistic unit assigned to one of the lower-levels of the hierarchy, wherein the logistic unit for the particular hierarchical level includes a predetermined quantity of stock;

requesting a count of the stock: (i) that includes a physical count of the logistic unit for the particular hierarchical level, and (ii) that does not include a physical count of types of logistic units for levels from the hierarchy other than the particular hierarchical level;

in response to the count request, generating a stock quantity for the particular hierarchical level based on the physical count of the logistic unit for the particular hierarchical level and the predetermined quantity of stock for the logistic unit;

in response to the request, receiving the stock quantity for the particular hierarchical level based on the physical count of the logistic unit for the particular hierarchical level;

generating count results based on the received stock quantity, wherein the generated count results include a deviation between the generated stock quantity and an expected stock quantity;

determining that the deviation between the generated stock quantity, which is based on the physical count of the logistic unit for the particular level, and the expected stock quantity exceeds a predetermined threshold;

selecting, in response to determining that the deviation exceeds the threshold, another level of the hierarchy that is assigned a type of logistic unit that is spatially included in the type of logistic unit that is assigned to the particular hierarchical level; and requesting a second count of the stock: (i) that includes a physical count of the logistic unit for the other level of the hierarchy, and (ii) that does not include a physical count of types of logistic units for levels from the hierarchy other than the other level of the hierarchy.

* * * * *